INVENTOR.
PETRUS J. VAN GERWEN.
BY
AGENT

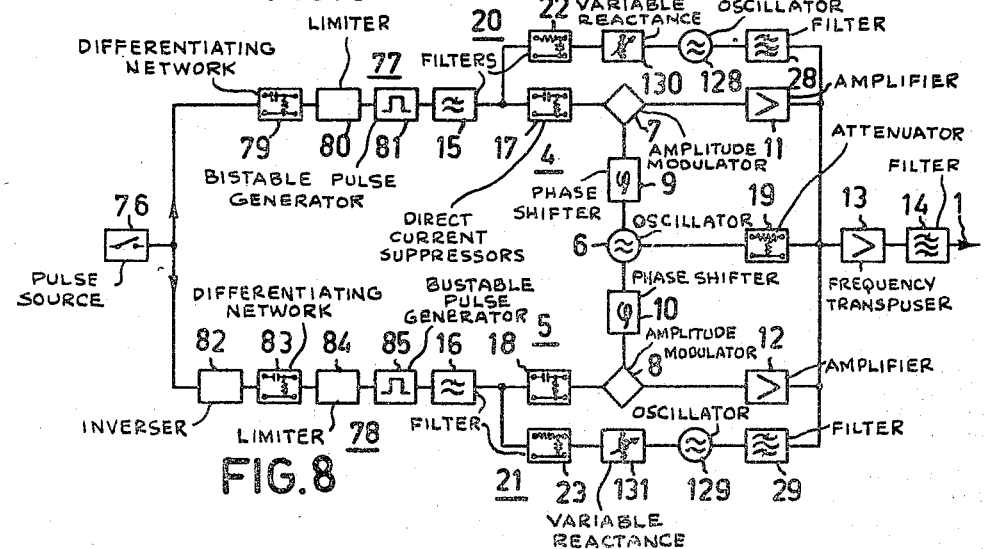
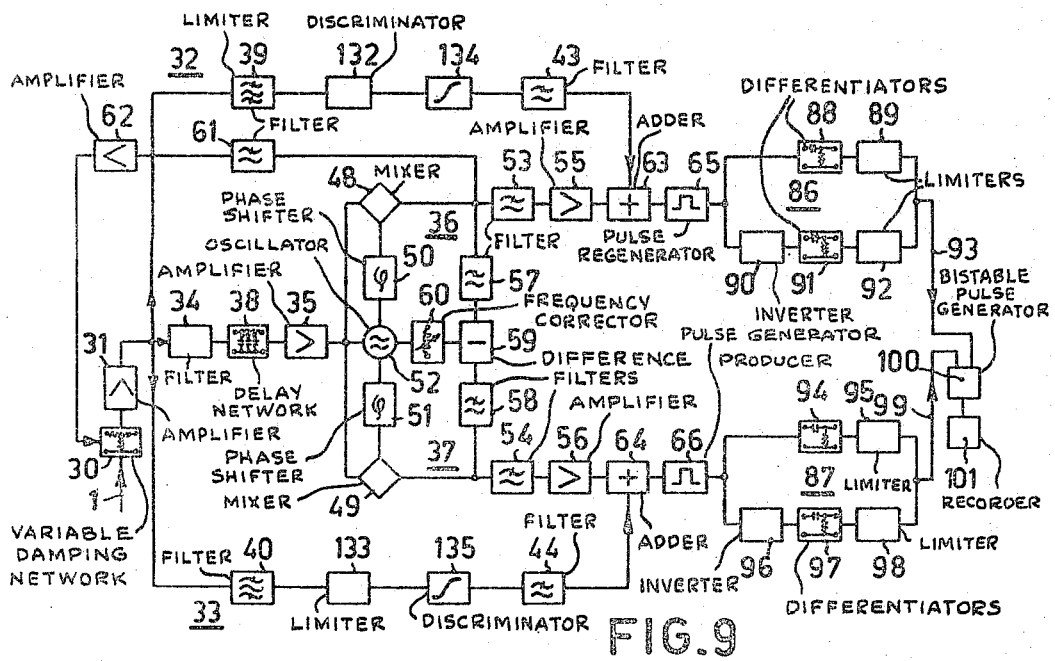

United States Patent Office 3,343,093
Patented Sept. 19, 1967

3,343,093
DUAL - CHANNEL QUADRATURE - MODULATION PULSE TRANSMISSION SYSTEM WITH DC COMPONENT TRANSMITTED IN SEPARATE CHANNEL
Petrus Josephus van Gerwen, Emmasingel, Eindhoven, Netherlands, assignor to North American Philips Company, Inc., New York, N.Y., a corporation of Delaware
Filed July 15, 1963, Ser. No. 295,061
Claims priority, application Netherlands, July 19, 1962, 281,180/62
11 Claims. (Cl. 325—60)

The invention relates to transmission systems for the transmission of pulse signals, for example, pulse code modulation, synchronous and asynchronous telegraphy, in a prescribed transmission band and to the associated transmitting and receiving devices, the pulse signals being transmitted at the transmitting end as a modulation of a carrier modulation through a transmission path to the receiving end, while the pulse signals which control a pulse regenerator for pulse regeneration are restored by demodulation at the receiving end.

In pulse transmission devices, for example for use in electronic computers, telex equipment and the like, the communication of the pulse signals may require the use of existing communication lines which are designed for speech transmission but not particularly suitable for the direct transmission of pulse signals. Due to the different natures of the signals to be transmitted the requirements to be satisfied by the communication line in the case of speech transmission and in that of pulse transmission are quite different, more particularly, in speech transmission it is essential only to pay attention to the amplitude against frequency characteristic over the speech band of from 300–3400 c./s., whereas in the transmission of pulse signals special attention is also required for the linearity of the phase against frequency characteristic and for the transmission of the direct-current component of the pulse signals, which, as is well known, constitutes an important component of the pulse information. For an undisturbed transmission of the direct-current component it is common practice to modulate the pulse signals on a carrier, since the direct-current component is thus displaced to the carrier frequency, and the transmission of pulse signals at a comparatively low pulse frequency, for example, of 500 baud, which means at the most 500 pulses per second, through existing communication lines is then rendered possible in a simple manner.

Upon increasing the pulse frequency in order to increase the information contents of the transmitted pulse train corresponding to an equal increase in the required bandwidth, special additional steps must be taken for the pulse transmission in view of the unfavourable phase against frequency characteristic of the existing communication lines, for which purpose two different methods are known. More particularly, in the first of these methods the total band of the communication line is divided into sub-bands of a magnitude such that in each of these sub-bands the phase distortions of the pulse signals are still within permissible limits, and the pulse information of the original pulse train is distributed over these sub-bands prior to transmission, the original pulse train being restored at the receiving end from the information transmitted through the various sub-bands, whilst in the second method the total band of the communication line is made suitable for pulse transmission, without division into sub-bands, by means of suitable smoothing of the phase against frequency characteristic. From the view points of economy in equipment and of flexibility the second method is to be preferred.

The total band of the communication line has thus become available for the pulse transmission, however, the maximum obtainable pulse information is by no means transmitted through the communication line, for the pulse information per cycle per second of bandwidth of the communication line proves to be very unfavourable relative to the maximum value obtainable in theory which, according to the information theorem, is 2 baud per c./s. For example, the pulse information in the frequency-shift telegraphy system, which has been developed for telegraph communication through the transatlantic cable with a view to maximum pulse information, is only 0.80 baud per c./s. of bandwidth, the bandwidth of the communication line being measured between the 10 db points of damping.

In the recent development of pulse transmission systems endeavours are being made to increase the pulse information transmitted over the prescribed frequency band of the communication line, and for this purpose several pulse transmission systems have been developed which per c./s. of bandwidth contain a pulse information exceeding the value of 0.80 baud of the above mentioned frequency-shift telegraphy system used for transatlantic traffic.

Thus, in a first pulse transmission system an increase in the pulse information per c./s. of bandwidth has been obtained by using single-sideband modulation with a partly suppressed second sideband (vestigial side-band), the carrier being located at the upper limit of the transmission band. The pulse information has thus been raised to 1.0 baud per c./s. of bandwidth, but for obtaining undisturbed pulse transmission special steps must be used in this arrangement to ensure accurate smoothing of the damping against frequency characteristic and of the phase against frequency characteristic, especially in the direction of the upper limit of the transmission band.

In a second pulse transmission system of this kind the pulse information has been increased to 1.1 baud per c./s. of bandwidth by using a phase modulation method specially developed for this purpose, however, this pulse transmission system has a very complicated structure, for example it employs 2500 transistors, and the adjustment of this system is critical and complicated whilst its flexibility has considerably decreased so that it is unsuitable, for example, for asynchronous telegraphy. Consequently, upon increasing the pulse information, the complication in the structure of the pulse transmission system together with the required accuracy of adjustment have been found to increase cumulatively, while furthermore the flexibility has decreased to a considerable extent. Thus, the international professional world, represented by the C.C.I.T.T, has determined that with the modern technique at most 3000 baud can be transmitted for the bandwidth of about 2500 c./s. as commonly used for pulse communication per speech connection, that is to say, a pulse information of 1.2 baud per c./s. of bandwidth is now considered by the C.C.I.T.T. as the maximum obtainable.

In United States Patent 3,311,442 a pulse transmission system is described which means a great stride forward in the technique of pulse transmission. The arrangement described in the said application, while being of simple structure, incorporates a new idea of eliminating the influence of the transmission path on the pulse transmission and hence comes near to the theoretically obtainable pulse information of 2 baud per c./s. of bandwidth, for example, in the pulse transmission system described in the above-mentioned application a pulse information of 1.70 baud per c./s. of bandwidth is obtained in a simple manner while moreover the said system is distinguished by its flexibility, its not particularly critical adjustment and optimum freedom from interference.

In this pulse transmission system, the transmission of which is designated as complementary orthogonal modulation, in abbreviated form CO-modulation, the transmitting device comprises two channels including modulators which are connected to a common carrier oscillator and which modulate the pulse signals of these channels on the common carrier oscillation with a mutual phase shift of 90°, at least one transmission channel (first transmission channel) including a network suppressing the direct-current component of the pulse signals occurring in this channel, the pulse signals of the two channels thus modulated on the common carrier oscilllation, together with a pilot oscillation of carrier frequency, being jointly transmitted through the transmission path. The receiving device comprises two receiving channels each including a demodulator and a succeeding pulse regenerator, a local carrier oscillation restored from the cotransmitted pilot signal being supplied at least to the demodulator of the receiving channel corresponding to the first transmission channel for demodulation of the pulse signals transmitted with suppressed direct-current components, said pulse signals controlling for regeneration a pulse regenerator including a feedback network in the form of a low-pass filter connected between the output circuit and the input circuit and having a time constant of the same order of magnitude as the time constant of the network included in the first transmission channel for suppressing the direct-current component of the pulse signals.

The present invention relates to another embodiment of a pulse transmission system of the CO-modulation type which, while containing a slightly lower pulse information per c./s. of bandwidth, for example, from 1.3 to 1.4 baud per c./s. of bandwidth, has available a greater bandwidth for the pulse transmission by utilizing portions of the transmission band which owing to successive phase distortions are not normally suitable for pulse transmission but under certain circumstances can be used to advantage, for example, in the transmission of pulse signals in which in the transmission path comparatively great variations in the transmission properties, especially in the level, have to be allowed for, for example, in overhead transmission lines and radio communications.

The transmission system according to the present invention is characterized in that the transmission device comprises two main transmission channels including modulators which are connected to a common carrier oscillator and modulate the pulse signals of these main transmission channels on the common carrier oscillation, with a mutual phase shift of 90°, in the central portion of transmission band, at least one of the main transmission channels (first main transmission channel) including a network suppressing the direct-current component of the pulse signals occurring in this channel, the pulse signals thus modulated on the common carrier oscillation towards the central transmission band, together with a pilot oscillation of carrier frequency, being jointly transmitted through the transmission path, while an auxiliary transmission channel is added to the first main transmission channel and is fed with the pulse signals of this transmission channel, this auxiliary transmission channel including a modulator and the associated carrier oscillator and further a network which passes only the direct-current component of these pulse signals, said direct-current component being supplied to the common transmission path in the modulator in an outermost transmission band situated outside the central transmission band of the two main transmission channels, while the receiving device comprises two main receiving channels for the reception of the signals transmitted in the central transmission band, each of these main channels including a demodulator and a succeeding pulse regenerator, and an auxiliary receiving channel for the reception of the signal transmitted in the outermost transmission band, which auxiliary channel includes a suitable demodulator, a local carrier oscillation restored from the cotransmitted pilot signal being applied at least to the demodulator of the main receiving channel corresponding to the first main transmission channel for demodulating the pulse signals transmitted with suppressed direct-current component through the first main transmission channel, said pulse signals being applied to the pulse regenerator through a summation device which is also fed with the output signal of the auxiliary receiving channel.

A particularly advantageous transmission system according to the invention is characterized in that each main transmission channel includes a network suppressing the direct-current component and is associated with an auxiliary transmission channel including a modulator with a carrier oscillator connected thereto and a network which passes only the direct-current component of the pulse signals, each of these direct-current components being supplied to the common transmission path in the modulators in outermost transmission bands situated outside the central transmission band of the two main transmission channels, while at the receiving end there is added to each of the main receiving channels for the reception of the signals transmitted in the central transmission band an auxiliary receiving channel for the reception of the signals situated in the outermost transmission bands and the local carrier frequency is applied to each of the demodulators in the two main receiving channels or demodulating the pulse signals transmitted with suppressed direct-current component, said demodulated pulse signals being applied to the relevant pulse regenerators through summation devices which are fed with the output signals of the demodulators in the auxiliary receiving channels.

In this arrangement not only the phase but also the amplitude of the cotransmitted pilot signal is independent of the transmitted pulse components so that the pilot signal can also be used for level control and furthermore the insensitivity to interference is increased.

In order that the invention may readily be carried into effect, it will now be described in detail, by way of example, with reference to the accompanying diagrammatic drawings, in which:

FIGURES 1 and 2 show transmitting and receiving devices respectively of a pulse transmission system according to the invention, while FIGURE 3 is a frequency diagram and FIGURES 4a–d and 5a–e are time diagrams illustrating the operation of the transmitting and receiving devices shown in FIGURES 1 and 2;

FIGURES 6 and 7 show in greater detail filter networks which may be used to advantage in a pulse transmitter according to the invention;

FIGURES 8 and 9 show transmitting and receiving devices respectively according to the invention which are designed for the transmission of the signals from a single pulse source, while

Figure 12:
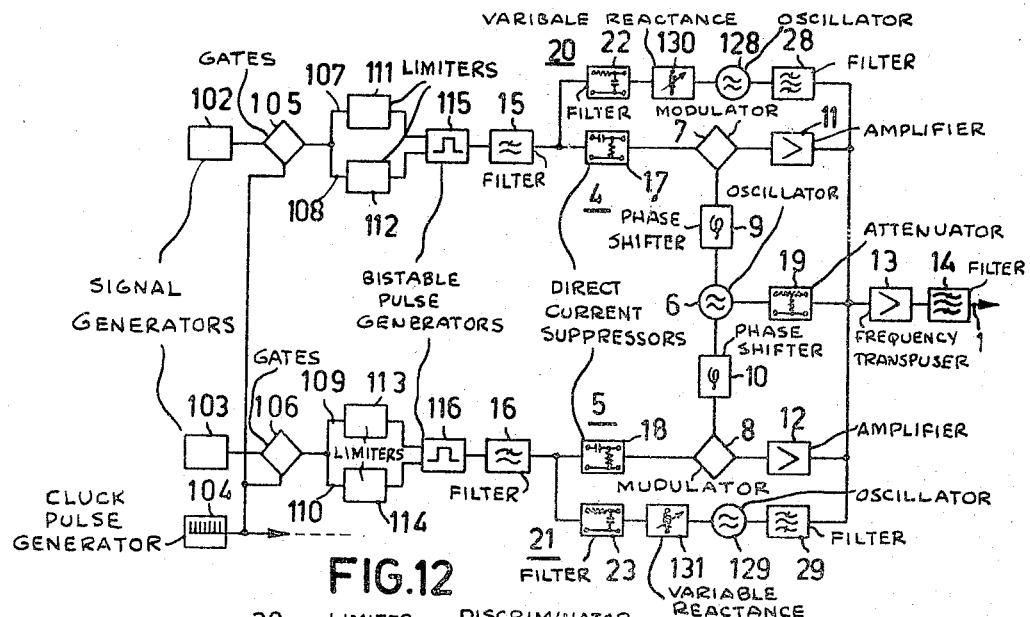
Figure 13:
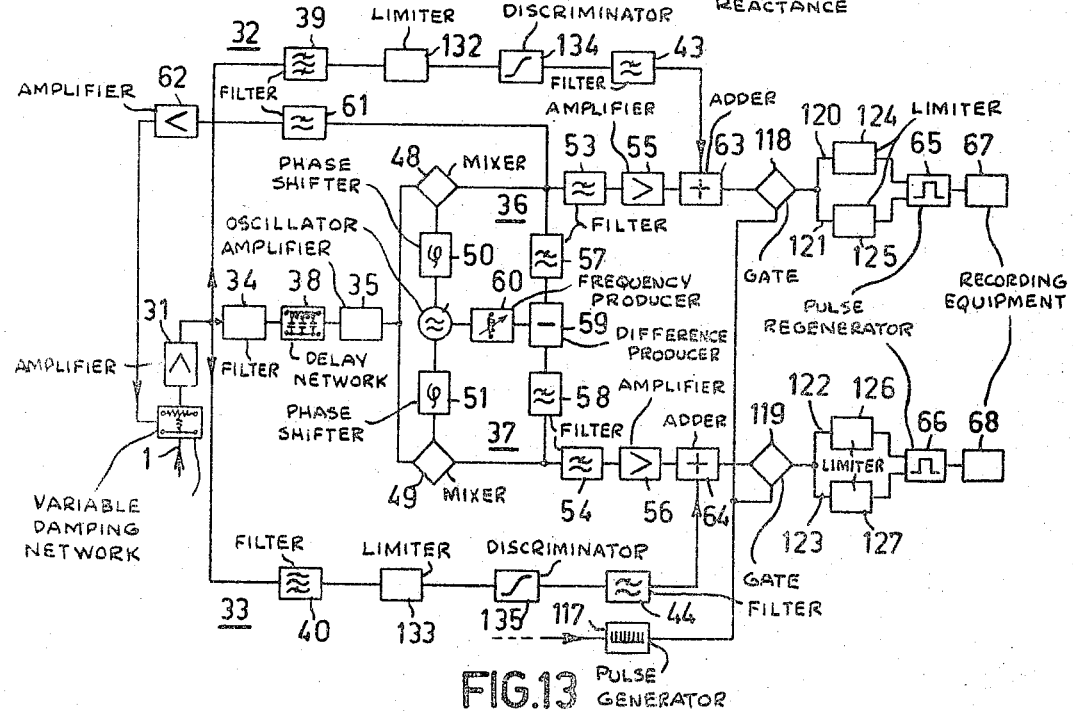

FIGURES 12 and 13 show transmitting and receiving devices respectively according to the invention which are designed for the transmission of synchronous telegraphy or pulse code modulation, while FIGURES 14a–d and 15a–d show time diagram illustrating the operation of the transmitting and receiving devices of FIGURES 12 and 13.

Figure 1:
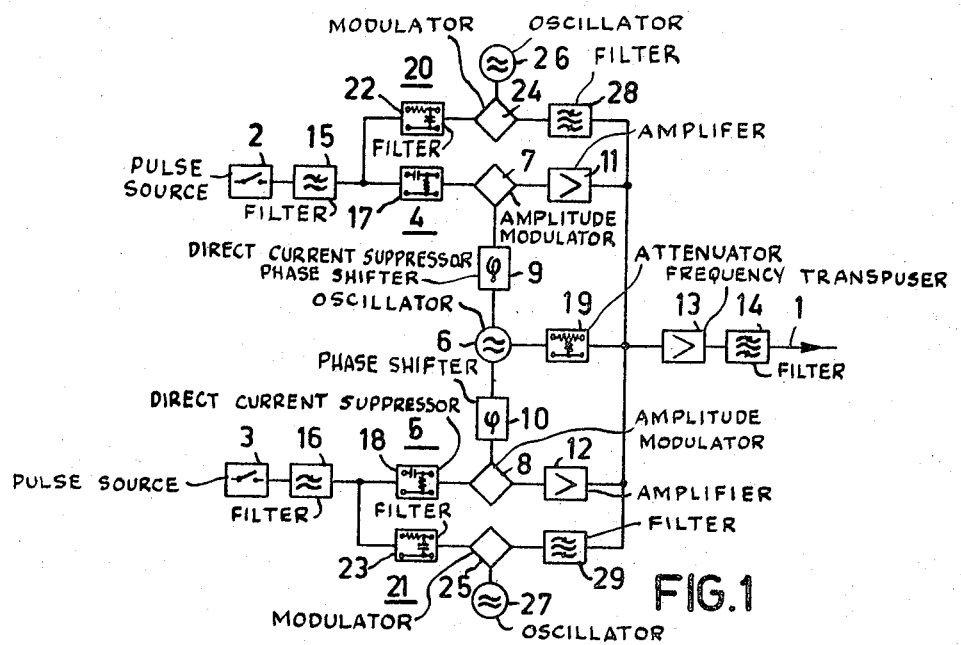

FIGURE 1 shows a transmitting device of a pulse transmission system according to the invention for the transmission of asynchronous telegraphy signals situated in the speech band, more particularly in the frequency band of from 400–3200 c./s., through a transmission line 1, the asynchronous telegraphy signals being derived from two pulse sources 2 and 3 connected to main transmission channels 4 and 5, respectively. The two main transmission channels 4 and 5 are similar in structure and each designed for the transmission of telegraphy pulses at a transmission speed of 1800 baud.

For the transmission of the telegraphy pulses of the two main transmission channels 4 and 5 through the common transmission line 1, the main transmission channels 4 and 5 each include an amplitude modulator 7 and 8 respective in the form of a push-pull modulator, for example, a ring modulator, connected to a common carrier oscillator 6, the carrier oscillation being modulated in the amplitude modulators 7 and 8 with a mutual phase shift of 90°. For this purpose, in the embodiment shown, the connecting lines to the amplitude modulators include phase shifting networks 9 and 10 respectively which cause the carrier oscillation to lead by 45° and to lag by 45° respectively. The output voltages of the two amplitude modulators 7 and 8 are applied through separating amplifiers 11 and 12 respectively and, if desired, after frequency transposition in a stage 13 including an output filter 14 to the transmission line 1.

The main transmission channels 4 and 5 each include a low-pass filter 15 and 16 respectively having a cut off frequency of 1000 c./s. for suppressing the spectrum components situated slightly above one half of the pulse frequency of 1800/2=900 c./s. and also include networks 17 and 18 for suppressing the direct-curent component of the pulses, having a cut-off frequency of, for example, 25 c./s., corresponding to a time constant of 6.4 ms., components situated slightly above one half of the pulse Thus, only the frequency spectrum of from 25 to 1000 c./s. of the telegraphy pulses of 1800 baud is applied to the amplitude modulators 7 and 8 for modulating the carrier oscillation of, for example, 1800 c./s. The networks 17 and 18 suppressing the direct-current components of the pulses may be designed in a variety of manners, for example, as high pass filters which in the embodiment shown comprise a series capacitor and a parallel resistor, as shown diagrammatically in the figure.

To the input of the output stage 13 is also connected, through an attenuator 19, the carrier oscillator 6 for the transmission of a pilot signal at carrier frequency (1800 c./s.) which is transmitted through the transmission line 1 together with the frequency spectra, modulating the carrier, of the pulses to be transmitted for further manipulation at the receiving end. Due to the modulation process at the outputs of the amplitude modulators 7 and 8 sidebands occur in the frequency ranges of from 800–1775 c./s. and from 1825 to 2800 c./s., the pulse components being removed from the frequency range of from 1775 to 1825 c./s. at the area of the pilot signal by the suppression of the direct current components of the two pulse trains in the networks 17 and 18, so that the cotransmitted pilot signal is not influenced in phase and amplitude by the transmitted pulse components. In the embodiment shown, the pilot signal leads by 45° with respect to the carrier oscillation of one pulse train and lags by 45° with respect to the other.

For the transmission of the telegraphy pulses there are added to the main transmission channels 4 and 5 auxiliary transmission channels 20 and 21 respectively which serve for the separate transmission of the direct-current components of the transmitted signal pulses, which components are suppressed in the main transmission channels 4 and 5. For this purpose the auxiliary transmission channels 20 and 21 include low-pass filters 22 and 23, modulators 24 and 25 with associated carrier oscillators 26 and 27, and output filters 28 and 29, respectively, which supply the direct-current components of the signal pulses derived from the low-pass filters 22 and 23 in an outermost transmission band lying outside the transmission band of the two main transmission channels 4 and 5 to the output stages 13. In the embodiment shown the low-pass filters 22 and 23 each comprise a series resistor and a parallel capacitor, and the frequencies of the carrier oscillators 26 and 27 lie one on each side of the transmission band of the main transmission channels, the oscillator frequencies being, for example, 500 c./s. and 3100 c./s., while the pass band of the output filters 28 and 29 is 300 c./s.

Figure 3:
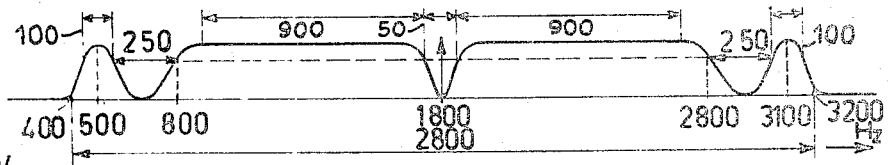

Thus the transmission device shown in FIGURE 1 transmits the signals shown in the frequency diagram of FIGURE 3, in which the signals transmitted through the main transmission channels 4 and 5 are constituted by the sidebands in the frequency ranges of from 800–1775 c./s. and from 1825–2800 c./s. in the central transmission band, the pilot oscillation being transmitted at 1800 c./s., while the signals transmitted through the two auxiliary channels 20 and 21 lie in the outermost transmission bands of from 450–550 c./s. and from 3050–3150 c./s., respectively. Frequency intervals of 250 c./s. are maintained between the signals in the central transmission band and the outermost transmission bands to ensure effective frequency separation.

FIGURES 4a–4d show time diagrams illustrating the operation of the transmission device shown in FIGURE 1.

Figure 4:
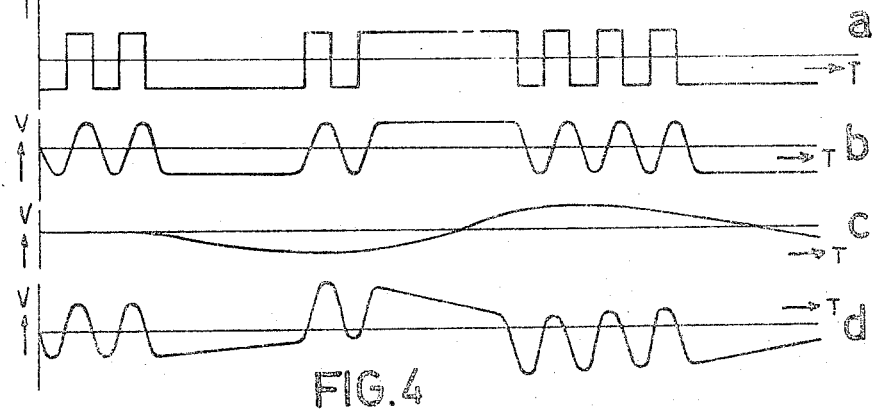

FIGURE 4a shows the telegraphy pulses transmitted by the pulse source 2 in one of the main transmission channels, for example, the channel 4, while FIGURE 4b shows the pulses of the higher pulse components of which have been suppressed in the low-pass filter 15.

FIGURE 4c shows the slowly varying direct-current component of the telegraphy pulses which is suppressed by the network 17 and the variation of which is determined by the variation of the damping and phase characteristic of the network 17 in the vicinity of the direct-current term. The synchronous telegraphy pulses applied as a modulating voltage to the amplitude modulator 7 are then obtained by subtracting the direct-current component shown in FIGURE 4c from the pulse train shown in FIGURE 4b, the result being the pulse train shown in FIGURE 4d.

With the design of the low-pass filter 22 shown, the signal applied through this filter 22 to the amplitude modulator 24 included in the auxiliary transmitting channel 20 has the form of the direct-current component of the signal pulses which is suppressed by the network 17 and hence can be represented by the time diagram of FIGURE 4c. Similarly the telegraphy pulses provided by the pulse source 3 are applied for modulation to the modulator 8 included in the main transmission channel 5 and to the modulator 25 in the auxiliary transmission channel 21, the resulting modulated signals being supplied together with the signals from the main transmission channel 4 and the auxiliary transmission channel 20 to the output stage 13 for further transmission through the transmission line 1.

In the transmission of the telegraphy signals from the two pulse sources 2 and 3 in the manner shown in FIGURE 1, the properties of the signals to be transmitted are made to match the properties of the transmission path 1 and more particularly the central part of the transmission path, which part is of high quality with respect to the damping and phase characteristic, is reserved for the broad-band output signals of the main transmitting channels 4 and 5 together with the pilot signal which, as mentioned hereinbefore, is not influenced with respect to its phase and amplitude by the pulse components, while for the transmission of the output signals from the auxiliary transmission channels 20 and 21, which signals owing to their nature and bandwidth are much less sensitive to the transmission properties of the transmission path, the outermost transmission ranges of the transmission path are used. For the transmission of the narrow-band signal of the auxiliary transmission channels the outermost transmission bands are used which, owing to their unfavourable phase characteristic, are not suitable for the transmission of the higher spectrum components of the pulse trains but are still suitable for the transmission of the direct-current components so that ultimately a larger effective bandwidth of the transmission path can be utilized for the pulse transmission.

With this configuration it has been found that the influence exerted by the transmission path on the pulse signals is materially reduced, thus permitting, with substantially complete elimination of the properties of the transmission path 1 which may be designed for speech communication, a greater effective bandwidth of the transmission path to be utilized for the pulse transmission with the high pulse information of 1.3 baud per c./s. of bandwidth, that is to say, enabling a maximum pulse information to be transmitted through the transmission path.

Figure 2:
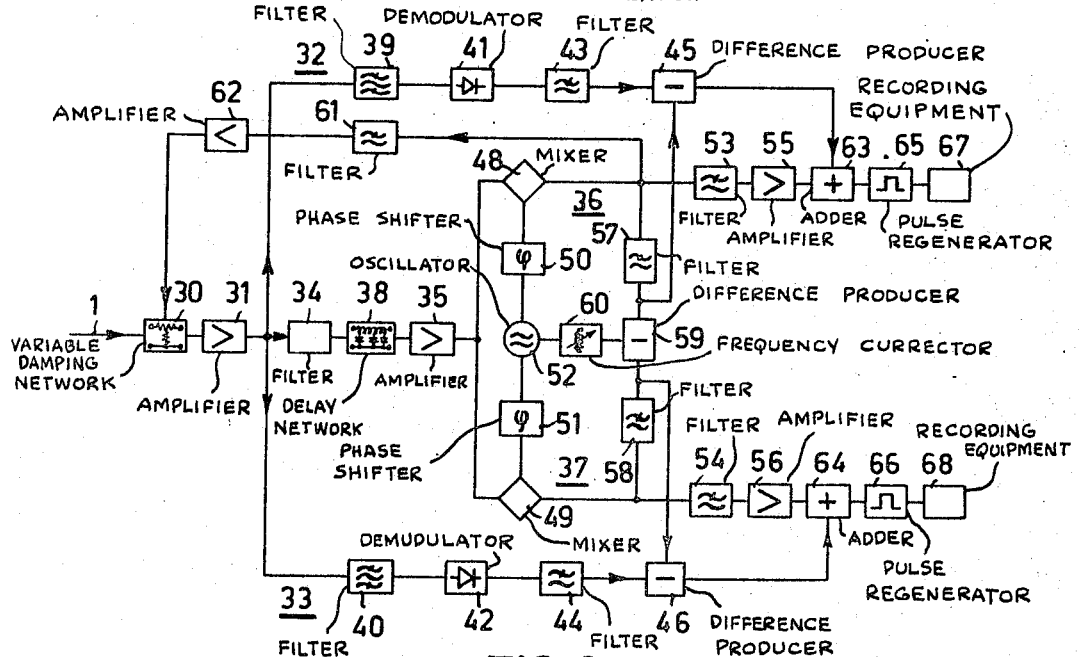

FIGURE 2 shows the receiver cooperating with the transmitter of FIGURE 1. In the receiver shown in FIGURE 2 the signals received through the transmission line 1 are applied, through a variable damping network 30 for level control, to an amplifier 31 the output circuit of which is connected to auxiliary receiving channels 32 and 33 and also, through a smoothing network 34 for smoothing the damping and phase characteristic and an amplifier 35, to two main receiving channels 36 and 37. A delay network 38 serving to compensate for the transmission time differences in the signals transmitted through the main transmission channels 4 and 5 and the auxiliary transmission channels 20 and 21, is connected between the smoothing network 34 and the amplifier 35.

The auxiliary receiving channels 32 and 33 include selecting filters 39 and 40 which have pass bands in the frequency ranges of from 450–550 c./s. and from 3050–3150 c./s. for selecting the signals transmitted through the auxiliary transmitting channels 20 and 21 respectively and are succeeded by amplitude demodulators 41 and 42 with associated filters 43 and 44 respectively the output signals of which through stages 45 and 46 to be described more fully hereinafter provide the direct-current component of the telegraphy pulses transmitted through the auxiliary transmission channels 20 and 21 respectively. Owing to the low-frequency nature and small bandwidth of the output signals of the auxiliary receiving channels 32 and 33 the shapes of these signals are only slightly dependent upon the properties of the transmission path 1, permitting faithful restoring of these signals transmitted in the outermost frequency bands without the use of additional steps, for example, it has been found that in the embodiment shown these signals can be taken directly, without smoothing, from the output circuit of the amplifier 31.

For demodulating the amplitude-modulated pulse trains transmitted by each of the main transmission channels 4 and 5 and having side bands lying in the frequency ranges of from 800–1775 c./s. and from 1825–2800 c./s., the main receiving channels 36 and 37 include demodulators 48 and 49 respectively in the form of mixing stages, for example ring modulators, which are connected, through phase shifting networks 50 and 51 leading by 45° and lagging by 45° respectively, to a common local carrier oscillator 52 the frequency and phase of which are stabilized on the received pilot signal. Since the local carrier oscillations applied to the demodulators 48 and 49 through phase shifting networks 50 and 51 leading by 45° and lagging by 45° respectively are exactly in phase with the carrier oscillations associated with the received pulse trains in the frequency ranges of from 800–1775 c./s. and from 1825–2800 c./s., at the output circuits of the two demodulators 48 and 49 the individual demodulated pulse trains in the frequency ranges of from 25–1000 c./s. are produced and, through low-pass filters 53 and 54 having a cut off frequency of, for example, 1000 c./s., are taken from separating amplifiers 55 and 56 respectively for further manipulation.

The filters 53 and 54 have steep damping edges for suppressing the signals from the auxiliary transmitting channels 20 and 21 and any interference components in the transmission path and also for suppressing the signal components lying outside the information band, which are subjected to undesirable phase shifts in the transmission path.

The pulses from the main transmission channels 4 appear, for example, at the output circuit of the demodulator 48, and the pulses from the main transmission channel 5 appear at the output circuit of the demodulator 49. This results in separate demodulation of both pulse trains which together contain a maximum pulse information, while it has been found that the demodulation process was little or not influenced by pulse components in the transmission path, which influence would show itself by pulse distortion and mutual cross-talk of the demodulated pulse trains; in one practical embodiment, for example, the sum of the distortion level and the cross-talk level was less than −26 db relative to the pulse level, which may be regarded as insignificant for pulse transmission.

In the device described, the phase stabilisation of the local carrier oscillator 52 on the pilot signal of 1800 c./s. as required for the demodulation process is effected by utilizing the demodulators 48 and 49 already used for demodulating the amplitude-modulated pulses in the following manner: to the output circuits of the demodulators 48 and 49 are connected low-pass filters 57 and 58 respectively the output voltages of which control, through a difference producer 59, a frequency corrector 60, for example a variable reactance, connected to the local carrier oscillator. The cut-off frequency of the low-pass filters 57 and 58 is chosen to be considerably lower than the lowest pulse component transmitted, for example, 1 c./s.

In this device by mixing the pilot signal in the demodulators 48 and 49 designed as mixing stages with the local carrier oscillations applied thereto through the phase shifting networks 50 and 51 leading by 45° and lagging by 45° respectively, voltages dependent upon the mutual phase relationships of these signals are produced at the outputs of the low-pass filters 57 and 58 and, after subtraction in the difference producer 59, exactly stabilize the local carrier oscillator 52 on the phase of the pilot signal through the frequency corrector 60. Upon phase stabilization of the local carrier oscillator 52 on the pilot signal the phase differences between the pilot signal and the carrier oscillation in the two mixing stages 48 and 49 are equal to 45° and hence the output voltages of the low-pass filters 57 and 58 are also equal so that they do not give rise to phase readjustment of the local carrier oscillator 52 since they compensate one another in the difference producer 59. An exact phase stabilization of the local carrier oscillator 52 is thus obtained, for example, if a phase variation in the stabilized condition of the local oscillator occurs, the output voltage of one demodulator will increase and that of the other will decrease in accordance with this phase variation, and by substraction in the difference producer 59 this results in a control voltage which depends upon the magnitude and polarity of this phase variation and which, through the frequency corrector 60, returns the local carrier oscillator 52 to its stabilized state.

The demodulators 48 and 49 formed as mixer stages are used not only for demodulating the individual pulse trains from the main transmission channels 4 and 5 and for stabilizing the phase of the local carrier oscillator 52, but also for producing a level-control voltage for controlling the variable damping network 30 for the value of the direct voltage produced by mixing the local carrier oscillation and the pilot signal in the demodulators 48 and 49 also depends upon the value of the pilot signal, so that at the outputs of the demodulators 48 and 49 direct voltages appear which are directly suitable for level control. In the embodiment shown the direct voltage set up at the output of the demodulator 48 is selected by a low-pass filter 61 which suppresses the pulse components and the cut off frequency of which is, for example, 10 c./s., and applied as a level-control voltage to the damping network 30 through a separating amplifier 62.

Without mutual influencing, in this arrangement the three functions of demodulation of the individual pulse trains, phase stabilization of the local carrier oscillator 52 and level control are combined, that is to say, the arrangement according to the invention in the form described provides the possibility of an appreciable economy in equipment.

In the manner described the demodulated pulse trains from the main transmission channels 4 and 5 appear at the separating amplifiers 55 and 56 in the main receiving channels 36 and 37 respectively and the associated direct-current components appear at the stages 45 and 46 in the auxiliary receiving channels 32 and 33 respectively, while in order to restore the original pulse trains the output voltage of the separating amplifiers 55 and 56 and the output voltages of the auxiliary receiving channels 32 and 33 are applied, after being added in summation devices 63 and 64, to the pulse regenerators 65 and 66, which may be in the form of bistable pulse regenerators 65 and 66 respectively. Upon occurrence of each pulse the pulse regenerators in the form of bistable pulse regenerators 65 and 66 are excited, with the result that a regenerated pulse is produced in each output circuit and applied to recording equipment 67 and 68 respectively.

The operation of the receiving device shown in FIGURE 2 will now be described in greater detail.

Figure 5:
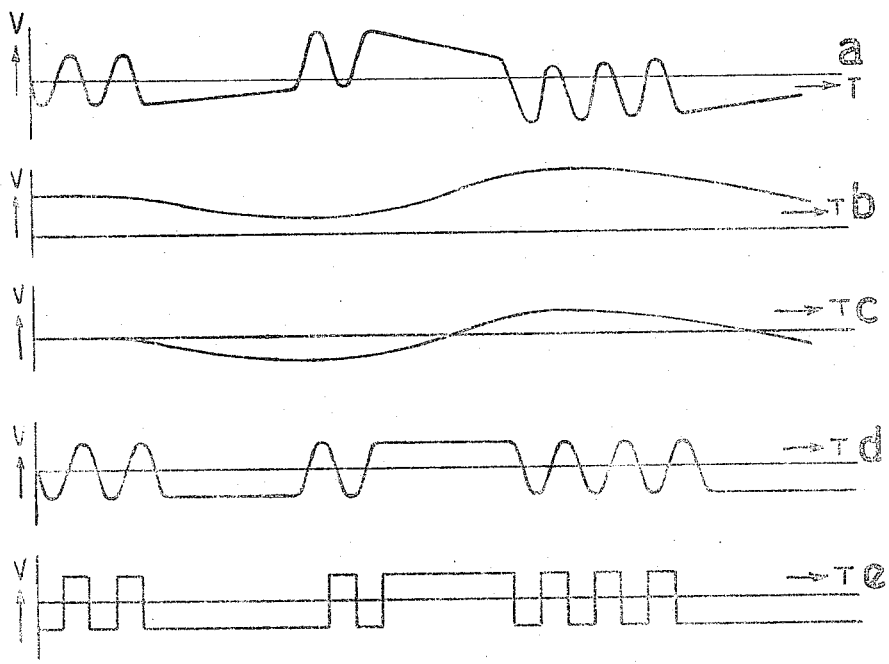

FIGURE 5a is a time diagram of demodulated pulses derived, for example from the demodulator 48, the wave form of these pulses corresponding to the pulse train with suppressed direct-current component shown in FIG. 4d, which was applied at the transmitting end as a modulating voltage to the amplitude modulator 7 in the main transmission channel 4. It has been found that the influence of the transmission path on the demodulated pulses was materially reduced since firstly the central part of the transmission path, which has optimal amplitude and phase characteristics is used for the transmission of these signals, while secondly the rigid phase relationship between the pilot signal required for producing the local carrier oscillations and the two pulse trains is retained; investigation has shown that at the area of the pilot signal in the transmission band and in its immediate vicinity the amplitude characteristic and the linearity of the phase characteristic of the transmission line 1 are substantially independent of the frequency.

Similarly the wave form of the pulse train taken from the demodulator 49 corresponds to the modulation voltage of the amplitude modulator 8 at the transmitting end.

FIGURE 5b shows the demodulated signal which appears at the output of the amplitude demodulator 41 in the auxiliary receiving channel and the shape of which, neglecting the constant direct voltage occurring with amplitude modulation, corresponds to the modulation voltage of the amplitude modulator 24 in the auxiliary transmitting channel. If this constant direct voltage is subtracted from the demodulated signal in a difference producer 45, for example, in the manner shown by the output voltage of the low-pass filter 57, the voltage shown in FIGURE 5c is produced which for further manipulation is added to the output voltage of the main receiving channel 36 in the summation device 63. The shape of the output signal of the auxiliary receiving channel 32 due to its low-frequency nature and its very small bandwidth of, for example, 100 c./s. is substantially independent of the properties of the transmission path, and it has been found that in the transmission of this signal in the outermost transmission bands of the transmission path, which owing to excessive phase distortions are not normally suitable for pulse transmission, this shape was substantially uninfluenced.

FIGURE 5d shows the output signal of the summation device 63, and FIGURE 5e shows the output signal of the pulse regenerator 65 which is applied to the recording equipment 67.

In the above described pulse transmission system, which, while yielding the high pulse information of 1.3 baud per c./s. uses a greater effective bandwith for the pulse transmission it has been found that the pulse transmission is substantially uninfluenced by the transmission path and the two pulse trains substantially do not interfere with one another; distortion measurements show, by comparison of the pulses of FIGURE 5e applied to the recording equipment 67 with the pulses of FIGURE 4a delivered by the pulse sources, that there is a pulse distortion of about 10%, which is insignificant with respect to pulse transmission. The equipment used provides a maximum of transmitted pulse information, since with the high pulse information of 1.3 baud per c./s. of bandwidth the effective bandwidth used for pulse transmission in the transmission path is increased, and further is very simple while its adjustment is not very critical, for example, no special requirements need be satisfied by the smoothing network 34, and also the equipment is very flexible in use. Thus, the described transmission may be employed for the transmission of several types of pulses, for example, asynchronous telegraphy, synchronous telegraphy, pulse code modulation, and it may be used for transmission both by lines and by wireless without taking special steps.

The insensitivity of the transmission system described to noise and interference may generally be regarded as very satisfactory. It has been found that variations in the level in the transmission path occur simultaneously and in equal degrees in the main channels and the auxiliary channels, with the result that the mutual relationship with respect to the level between the output signals of the main receiving channels 36 and 37 and the auxiliary receiving channels 32 and 33 is maintained so that the satisfactory operation of the pulse regenerators 65 and 66 is uninfluenced even by strong variations in the level.

The invention has been described hereinbefore with reference to advantageous transmitting and receiving devices, however, alternative embodiments are possible without departing from the scope of the invention. For example, at the transmitting end the phase shifting networks 9 and 10 in the carrier line which lead by 45° and lag by 45° respectively may be replaced by phase shifting networks of other types provided that the carrier oscillation is modulated with a mutual phase shift of 90°, and furthermore this modulation with a mutual phase shift of 90° may be effected in a different manner, for example, by including a delay network having a suitable delay period in the output circuit of one of the amplitude modulators.

At the receiving end, within the scope of the invention, it is not absolutely necessary to use the demodulating stages 48 and 49 for the phase stabilization of the local oscillator but a separate phase stabilization circuit may be used. If desired, the local carrier oscillation need not be produced with the aid of a local carrier oscillator 52, but may be obtained by selection of the pilot signal in a selective filter and a succeeding amplifier, whilst for pulse regeneration a slicer may be used which may, for example, be in the form of the combination of a limiter and a threshold device.

Furthermore a summation device may be used for the phase stabilisation instead of the difference producer 59, by reversing the polarity of the output voltage of the demodulator 49.

FIGURE 6 shows in greater detail a particularly advantageous embodiment of a network for suppressing the direct-current component of the pulses which is used in a main transmission channel, while FIGURE 7 shows an associated low-pass filter for use in an auxiliary transmitting channel. The direct-current suppression network shown in FIGURE 6 comprises the cascade connection of two RC-networks including series capacitors 69 and 70 and parallel resistors 71 and 72 respectively; this cascade connection has the advantage that pulse components in the vicinity of the pilot signal are suppressed more satisfactorily. The associated low-pass filter shown in FIGURE 7 comprises a series coil 74 shunted by a resistor 73, and a parallel capacitor 75. The design and construction of these networks will now be described in greater detail.

As explained hereinbefore, in the transmission system according to the invention, in which at the transmitting end the pulses with suppressed direct-current component are transmitted in the central band through the main transmitting channels 4 and 5 and the associated direct-current components are transmitted by the auxiliary transmitting channels 20 and 21 in the outermost frequency bands, the transmitted pulses are faithfully restored, at the receiving end, with maximum pulse information and material reduction of the influence of the properties of the transmission path by applying the signals demodulated in the main receiving channels 36 and 37 together with the output signal of the associated auxiliary receiving channels 32 and 33 to the pulse regenerators 65 and 66 respectively. Since the direct-current component suppressed at the transmitting end by the networks 17 and 18 is again added in the summation devices 63 and 64 at the receiving end, after transmission through the auxiliary transmission channels 20 and 21 and the auxiliary receiving channels 32 and 33, to the pulses transmitted with suppressed direct-current component, in order to ensure a transmission which is free of distortion irrespective of the properties of the transmission path there must be an intimate relationship between the transmission characteristic $\phi_1(\omega)$ of the networks 17 and 18 suppressing the direct current component of the pulses and the overall transmission characteristic $\phi_2(\omega)$ of the auxiliary transmission channels and the auxiliary receiving channels, which in the embodiment shown is substantially determined by the low-pass filters 22 and 23.

If the shapes of the pulse-trains applied to the networks 17 and 18, which shapes are determined by the frequency spectra of these trains, are represented by a quantity V, the shapes of these pulse trains after passing through the direct-current suppression networks 17 and 18 which have the transmission characteristics $\phi_1(\omega)$ are given by $V\phi_1(\omega)$.

With a transmission which is free from distortion, the change in shape must be exactly compensated by the output signal of the auxiliary receiving channel, the shape of the signal transmitted by this channel being given by the magnitude $V\phi_2(\omega)$, where $\phi_2(\omega)$ is the overall transmission characteristic of the auxiliary transmission channels and the auxiliary receiving channels.

The required relationship between the transmission characteristics $\phi_1(\omega)$ and $\phi_2(\omega)$ follows directly from the condition of a distortionless transmission, and this is shown by the following formula:

$$V\phi_1(\omega)+V\phi_2(\omega)=V \quad (I)$$

or:

$$\phi_1(\omega)+\phi_2(\omega)=1 \quad (II)$$

In the transmission device shown in FIGURE 1, in which the networks 17 and 18 included in the main transmission channels 4 and 5 respectively for suppressing the direct-current component of the pulses are each formed by a series capacitor and a parallel resistor, while in the auxiliary transmission channels 20 and 21 low-pass filters 22 and 23 respectively are used which each comprises a parallel capacitor and a series resistor, these elements have the following values:

For the networks 17 and 18: Capacitor: 3 µf.; Resistor: 1 kohm.

For the networks 22 and 23: Capacitor: 3 µf.; Resistor: 1 kohm.

For the networks shown in FIGURES 6 and 7 these values are:

For the network of FIGURE 6: Capacitors 69, 70: 16 µf.; Resistors 71, 72: 1 kohm.

For the network of FIGURE 7: Inductance 74: 16 h.; Resistor 73: 330 ohm, Capacitor 75: 16 µf.

In proportioning the networks 22 and 23 allowance has been made for the transmission characteristics of the band-pass filters 28 and 29 in the auxiliary transmission channels 20 and 21 respectively and for the transmission characteristics of the bandpass filters 39 and 40 and the succeeding low-pass filters 43 and 44 in the auxiliary receiving channels 32 and 33 respectively.

For the sake of completeness it should be noted that the transmission of the direct-current component of the pulses can be effected not only by the low-pass filters 22 and 23 but also by designing the output filters 28 and 29 of the amplitude modulators as narrow band filters, whilst the direct-current component of the transmitted pulses can be suppressed not only by the networks 17 and 18 but also by means of rejection filters which are included in the output circuits of the amplitude modulators 7 and 8 and suppress the carrier frequency and those spectrum components of the pulses modulating the carrier frequency which lie in the immediate vicinity thereof.

FIGURES 8 and 9 show transmitting and receiving devices according to the invention which have been elaborated in greater detail. Corresponding elements are indicated by like reference numerals.

In the above described embodiments the transmitting devices and the cooperating receiving devices are designed for the transmission, through a transmission path of 2800 c./s. of the pulse signals delivered by two individual pulse sources 2 and 3 each having a transmission speed of 1800 baud. The transmission system according to the invention can be used not only for the transmission of pulses delivered by two independent pulse sources 2 and 3 each having a transmission speed of 1800 baud but also for the transmission of the pulses delivered by a single pulse source 76 which in this event can have the double transmission speed of 3600 baud.

Figure 10:
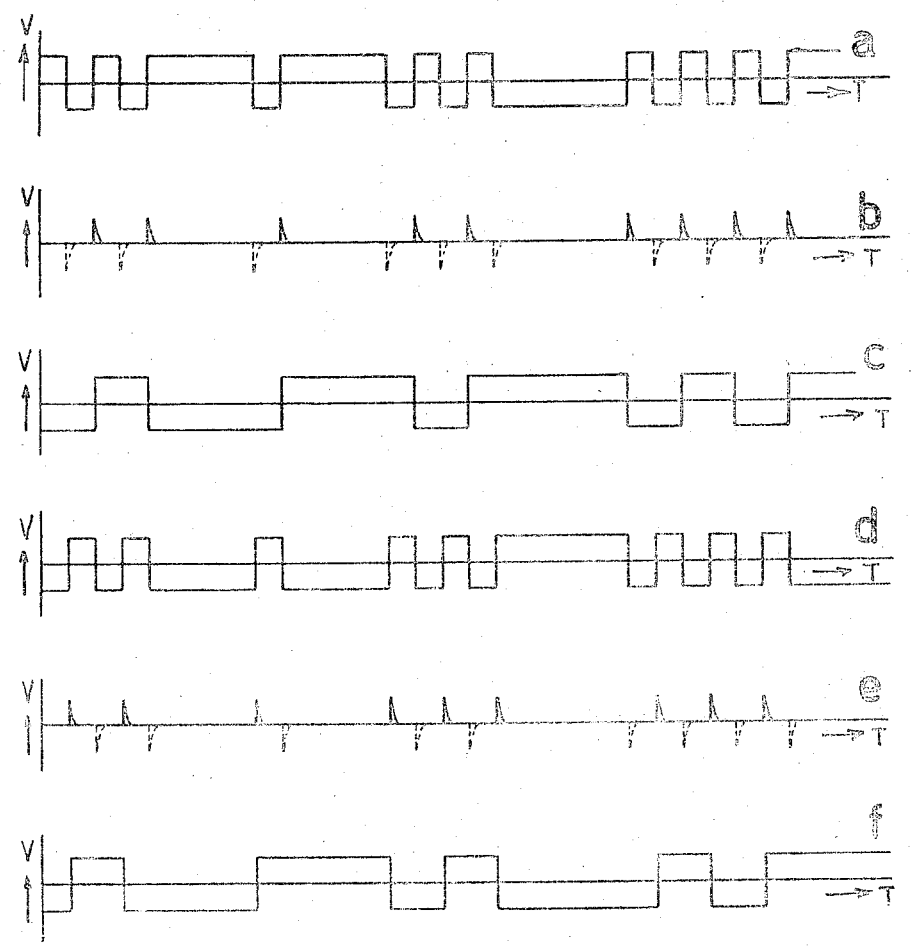
FIGURES 10a–f and 11a–i show associated time diagrams.
Figure 11:
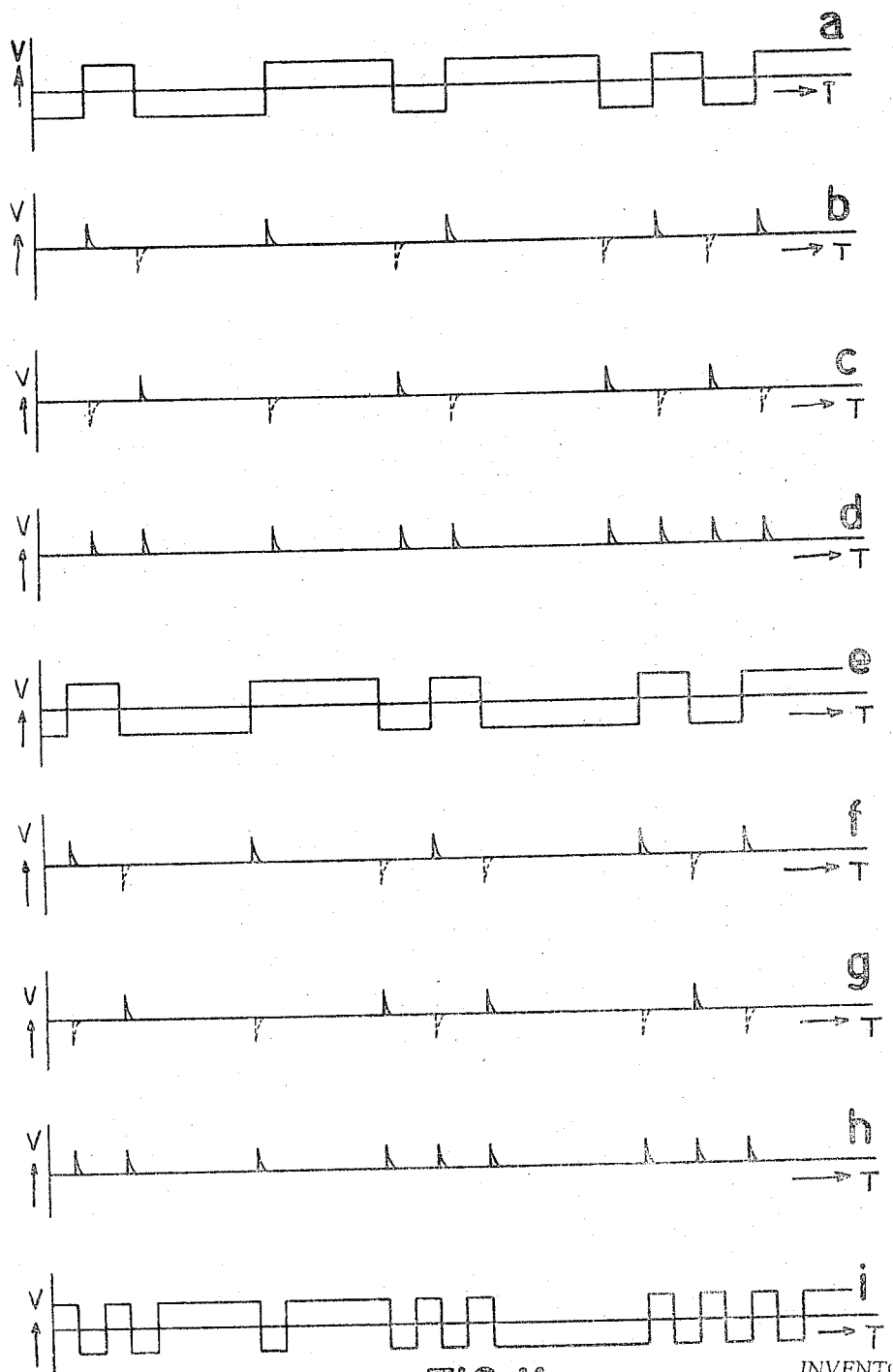

For this purpose, in the transmission device shown in FIGURE 8 the original pulse train of 3600 baud delivered by a pulse source 76 is converted into two pulse trains of 1800 baud each which are transmitted through main transmission channels 4 and 5 and auxiliary transmission channels 20 and 21 to the receiving device, while at the receiving end the pulse trains of 1800 baud each derived from the output circuits of pulse regenerators 65 and 66 are reconverted to the original pulse train of 3600 baud in a manner which will now be described with reference to the time diagrams of FIGURES 10 and 11.

In order to convert the pulses delivered by the pulse source 76 at a transmission speed of 3600 baud, which are shown in a time diagram in FIGURE 10a, into two pulse trains of 1800 baud each, these pulses are applied in parallel to two converting channels 77 and 78 connected to main transmission channels 4 and 5 and to associated auxiliary transmitting channels 20 and 21 respectively for transmission to the receiving device.

In the conversion channel 77 the pulse train shown in FIGURE 10a is applied to a differentiating network 79 for producing the pulse train shown in FIGURE 10b which, after suppression of the negative pulses shown by broken lines in a limiter 80, are applied to a bistable pulse generator 81. Upon the occurrence of each positive pulse of FIGURE 10b the bistable pulse generator 81 is flipped over from one state of equilibrium to the other with the result that the pulse train shown in FIGURE 10c is transmitted at one half of the original transmission speed, that is to say at 1800 baud, to the receiving device through the main transmission channel 4 and the auxiliary transmission channel 20. As FIGURE 10c shows, only the leading edges of the pulses shown in FIGURE 10a are characterized by this pulse train.

In the conversion channel 78 a pulse train is produced which characterizes only the trailing edges of the pulses from the pulse source, for which purpose the pulses of FIGURE 10a are inverted in phase in a phase inverter stage 82, the resulting pulse train (FIGURE 10d) being manipulated in the same manner as in the conversion channel 77. After differentiation in a differentiating network 83 and suppression of the pulses of negative polarity shown by broken lines in FIGURE 10e in a limiter 84, the said pulses are applied to a pulse regenerator 85 for producing the pulse train shown in FIGURE 10f, which is transmitted to the receiving device through the transmission channel 5 and the associated auxiliary transmission channel 21.

The two pulse trains shown in FIGURE 10c and FIGURE 10f have one half of the transmission speed of the original pulse train shown in FIGURE 10a but together they contain the complete information of the original pulse train of FIGURE 10a, since they jointly characterize both the leading and the trailing edges of the original pulse train of FIGURE 10a. Hence at the receiving end the original pulse train of FIGURE 10a having a transmission speed of 3600 baud can be restored in a conversion device from the said two pulse trains of FIGURES 10c and 10f.

In the embodiment shown the transmission of the signals in the auxiliary transmitting channels 20 and 21 is not effected by amplitude modulation but by narrow-band frequency modulation (modulation index 0.8), for which purpose the signals from the low-pass filters 23 and 24 in the auxiliary transmitting channels 20 and 21 are applied to variable reactances 130 and 131 coupled to oscillators 128 and 129 respectively, the frequency modulated oscillations being applied to the stage 13 through output filters 28 and 29 in the manner described with reference to FIGURE 1.

At the receiving end shown in FIGURE 9 the signals transmitted by the auxiliary transmission channels 20 and 21 are selected in the manner described with reference to FIGURE 2 by means of selecting filters 39 and 40 in the auxiliary receiving channels 32 and 33 and applied through limiters 132 and 133 to frequency discriminators 134 and 135 respectively, with the result that at the output circuits of the frequency discriminators 134 and 135 direct voltages which vary in accordance with the direct-current component of the pulses (compare FIGURE 5c) are obtained which in the summation devices 63 and 64 are directly added to the output voltages of the demodulators 48 and 49 included in the main transmission channels 36 and 37 respectively. The use of frequency modulation for the transmission of the signals from the auxiliary transmission channels 20 and 21 has the advantage that any frequency-dependent amplitude variations of these signals which are transmitted in the outermost transmission bands can be eliminated by the limiters 132 and 133, however, in order to maintain the relationship with respect to level between the output signals of the main transmission channels 36 and 37 and the auxiliary transmission channels 32 and 33 a sensitive level control is to be used.

In the manner described with reference to FIGURE 2, in the receiving device shown in FIGURE 9 pulse trains corresponding to those of FIGURES 10c and 10f are obtained by applying the output signals of summation devices 63 and 64 to pulse regenerators 65 and 66, the said two pulse trains being applied to two conversion channels 86 and 87 respectively in order to restore the original pulse train. For the sake of completeness FIGURES 11a and 11e show the pulses which appear at the output circuits of the pulse regenerators 65 and 66 and which correspond to the pulse trains illustrated in FIGURES 10c and 10f.

In the conversion channel 86 connected to the pulse regenerator 65 in the pulses from the pulse regenerator 65, which are illustrated in FIGURE 11a, are directly applied to the cascade arrangement of a differentiating network 88 and a limiter 89 and also, through a phase inverter stage 90, to a similar cascade arrangement of a differentiating network 91 and a limiter 92, the output circuits of the limiters 89 and 92 being connected in parallel to a common output line 93. By differentiation of the pulse train of FIGURE 11a in the differentiating network 88 the pulse train shown in FIGURE 11b is obtained, the negative pulses of which, which are shown by broken lines, are suppressed in the limiter 89, while by phase inversion of the pulse train of FIGURE 11a in the phase inverter stage 90 and subsequent differentiation in the differentiating network 91 the pulse train of FIGURE 11c is obtained, the negative pulses of which, which are shown by broken lines, are suppressed in the limiter 92. By addition of the pulse trains of FIGURES 11b and 11c the pulse train illustrated by FIGURE 11d then appears at the common output line 93, the pulses of the latter pulse train characterizing the leading edges of the original pulses of FIGURE 10a.

In the same manner, in the conversion channel 87 the pulses taken from the pulse regenerator 66, which are illustrated by FIGURE 11e, are directly applied to the cascade arrangement of a differentiating network 94 and a limiter 95 and also, through a phase inverter stage 96, to a similar cascade arrangement of a differentiating network 97 and a limiter 98. As a result there appear at the output circuits of the limiters 95 and 98 the pulse trains illustrated by FIGURES 11f and 11g respectively, the negative pulses of which, which are shown by broken lines, are suppressed in the limiters 95 and 98, the addition of these two pulse trains in the common output line 99 resulting in the pulse train which is shown in FIGURE 11h and the pulses of which characterize the trailing edges of the original pulses of FIGURE 10a.

In order to restore the original pulse train of FIGURE 10a from the pulses of FIGURES 11d and 11h in the output lines 93 and 99, these pulses are applied to a bistable pulse generator 100 which on the occurrence of a pulse at the output line 93 (FIGURE 11d) flips over to one stage of equilibrium and on the occurrence of a pulse in the other output line 99 flips over to the other state of equilibrium. FIGURE 11i illustrates the output pulses of the pulse generator 100 which, as will be seen from the figure, correspond to the original pulse train of FIGURE 10a when they are then applied to recording equipment 101.

The use of the steps according to the invention together with pulse conversion enable the pulses produced by a single pulse source 76 at a transmission speed of 3600 baud to be transmitted over a band of 2800 c./s. It is an essential feature of this conversion that at the transmitting end two parallel connected conversion channels 77 and 78 produce two pulse trains (FIGURES 10c and 10f) which characterize only the leading edges and only the trailing edges respectively, while at the receiving end in the two conversion channels 86 and 87 pulses are produced from the two transmitted pulse trains which correspond to the leading and trailing edges of the original pulse train (FIGURES 11d and 11h) and which for restoring the original pulse train (FIGURE 11i) control a bistable pulse generator 100 through separate lines 93 and 99 respectively.

The above described devices are not only suitable for asynchronous telegraphy but also for the transmission of synchronous telegraphy and pulse code modulation, the instants at which the transmitted pulses occur being determined by equidistant clock pulses from a clock pulse generator.

Figure 14:
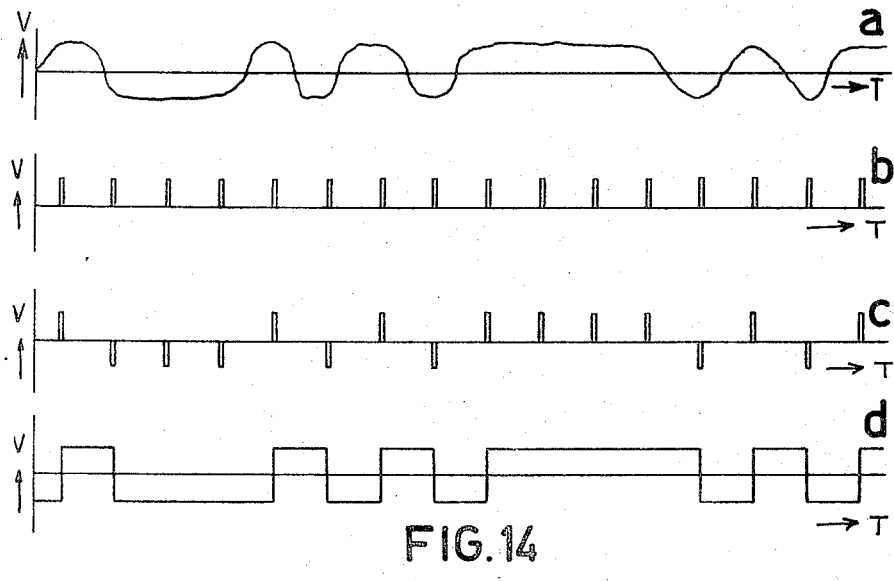

FIGURES 12 and 13 show a transmitter and a receiver respectively for the transmission of synchronous telegraphy or pulse code modulation, and the operation of these devices will be described with reference to the time diagram of FIGURES 14 and 15 respectively. Elements corresponding to those of FIGURES 8 and 9 are designated by like reference numerals.

In the transmitting device shown in FIGURE 12 the signals to be transmitted are taken from signal generators 102 and 103, for example a magnetic tape recorder with an associated clock pulse generator 104, the signals taken from the signal sources 102 and 103 being applied to gating devices 105 and 106 respectively which are controlled by the clock pulses and upon the occurrence of a clock pulse deliver a positive or a negative output pulse depending on whether the signal voltage of the clock pulse has a positive or a negative value. The repetition frequency of the equidistant clock pulses from the clock pulse generator 104 is, for example, 1800 c./s.

FIGURE 14a shows the time diagram of the signals to be transmitted, which are produced, for example, by the signal generator 102, and FIGURE 14b shows the associated clock pulses; the pulse train shown in FIGURE 14c then appears at the output of the gate 105, the polarity of the pulses of FIGURE 14c, which coincide in time with the equidistant clock pulses, characterizing the polarity of the signal to be transmitted. In the same manner the signals from the signal generator 103 are manipulated in the gate 106.

In order to transmit these pulse trains through the transmitting device, the pulses appearing at each of the gates 105 and 106 are separated in two parallel connected channels 107, 108 and 109, 110 into positive and negative pulses by limiters 111, 112, and 113, 114 respectively which are included in these channels and suppress the negative and positive pulses respectively, for example, in the channels 107 and 109 only positive pulses occur and in the channels 108 and 110 only negative pulses occur, these pulses which are separated according to polarity in the channels 107, 108 and 109, 110, being applied as control pulses to bistable pulse generators 115 and 116 respectively which on the occurrence of a positive pulse flip over to one state of equilibrium and on the occurrence of a negative pulse flip over to the other state of equilibrium. Thus the pulse train of FIGURE 14d appears at the output circuit of the pulse generator 115 and a similar pulse train appears at the output circuit of the pulse generator 116, these pulse trains being jointly transmitted to the receiving device of FIGURE 13 in the manner described hereinbefore through the main transmission channels 4 and 5 and the auxiliary transmission channels 20 and 21 via the transmission line 1.

In the receiving device of FIGURE 13 the two received pulse trains are manipulated in the above described manner, the incoming signals being applied, after demodulation in demodulators in the main receiving channels 36 and 37 and auxiliary receiving channels 32 and 33 and after addition in the summation devices 63 and 64, to bistable pulse generators 65 and 66 for further manipulation in the recording apparatus 67 and 68, respectively.

Since the incoming pulses are derived from a train of equidistant clock pulses, variations in time of the incoming pulses can simply be eliminated by connecting, between the summation devices 63 and 64 and the pulse regenerators 65 and 66, gates 118 and 119 respectively which are controlled by a pulse generator 117 and upon the occurrence of a positive signal voltage produce a positive output pulse and upon the occurrence of a negative signal voltage deliver a negative output pulse. In the manner discussed above in the description of the transmitting device, the positive and negative output pulses of the gates are applied through two parallel connected channels 120, 121, and 122, 123 including limiters 124, 125 and 126, 127, to bistable pulse regenerators 65 and 66 respectively which upon the occurrence of a positive pulse flip over to one state of equilibrium and upon the occurrence of a negative pulse flip over to the other state of equilibrium. The clock pulse generator 117 is exactly synchronized in phase by the clock pulse generator 104 at the transmitting end in a manner which is not of importance for the present invention, for example, synchronization may be effected in a manner commonly used in pulse code modulation or an individual transmission channel may be used for this purpose.

Figure 15:
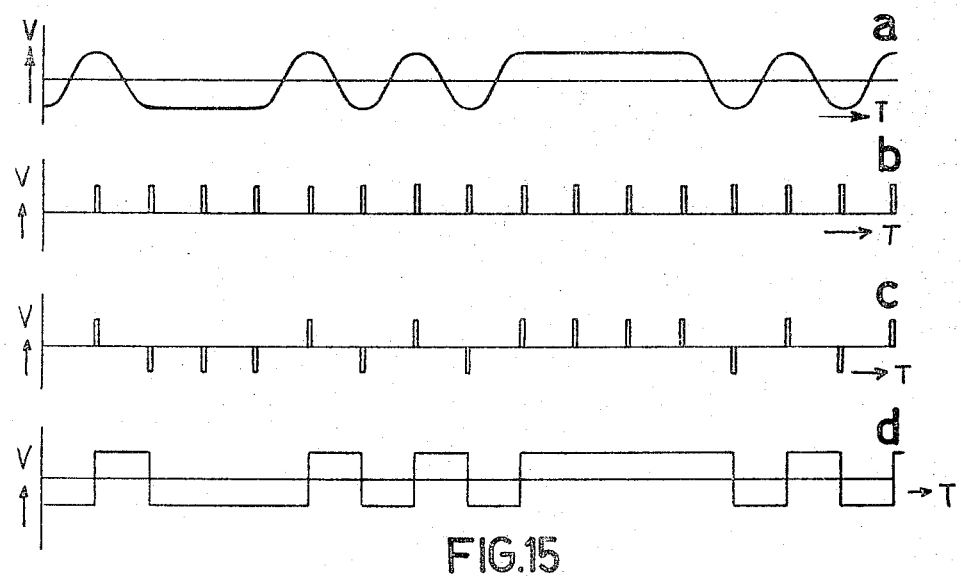

FIGURE 15 shows time diagrams illustrating the operation of the receiving device shown in FIGURE 13. If, for example, FIGURE 15a shows the signal appearing at the summation device 63 and FIGURE 15b shows the equidistant clock pulses produced by the clock pulse generator 117, the pulses shown in FIGURE 15c are produced in the gate 118 and then converted in the pulse regenerator 65 to the pulse train shown in FIGURE 15d. The signals from the addition device 64 are manipulated in the same manner.

Finally it should be noted that in addition to the above described embodiments alternative embodiments are possible. For example, the signals from one of the pulse sources may be transmitted in the above described manner through a main transmission channel and an auxiliary transmission channel while the signals from the other pulse source are transmitted in the usual manner through normal amplitude modulation. However, in such an arrangement the transmission properties are less satisfactory than those of the above-described arrangement, and especially the sensitivity to interference is considerably higher, for example, the transmitted power must be increased by a factor of from 3–4 with respect to the above described arrangement in order to obtain the same insensitivity to interference and furthermore a separate pilot signal must be used for the level control. Under these circumstances it is preferable to convert such an arrangement to an arrangement according to one of the above described embodiments which are distinguished not only by the high pulse information of from 1.3–1.4 baud per c./s. of bandwidth but also by their simple and attractive structure, their great flexibility and optimum insensitivity to interference.

What is claimed is:
1. A pulse transmission system for the transmission of pulse signals in a given transmission band, comprising a transmitter, a receiver, and a transmission path between said transmitter and receiver, said transmitter comprising a source of first and second pulse signals, first and second transmitter channels, means applying said first and second signals to said first and second transmitter channels respectively, at least one of said channels including means for suppressing the direct current component of signals in said one channel, a source of common carrier oscillations, first and second modulator means for modulating said carrier oscillations with the signals of said first and second channels respectively with a mutual phase displacement of 90°, means providing pilot oscillations of the frequency of said carrier oscillations, an auxiliary transmission channel including a source of auxiliary oscillations, means for modulating said auxiliary oscillations with the signals applied to said one channel to produce modulated oscillations having only modulation components related to the direct current components of said signals applied to said one channel, means for applying said pilot oscillations and the outputs of said first and second modulator means to said transmission path in the central part of said transmission band, and means for applying said modulated auxiliary oscillations to said transmission path in an outer portion of said transmission band outside the portion thereof in which the outputs of said first and second modulators are transmitted; said receiver comprising first and second receiving channels for receiving signals in said central part of said transmission band, each of said receiving channels comprising demodulator means and pulse regenerator means, means connecting each said demodulator means to said transmission path, and means connecting the output of said demodulator means to said pulse regenerator means of the respective channel, said receiver further comprising means providing a local carrier oscillation synchronized with said pilot oscillations, means applying said local carrier oscillations to the demodulator means of said first receiver channel for demodulating the signals corresponding to signals of said first transmitter channel which were transmitted with suppression of the direct current component, the means connecting the output of the demodulator means to the pulse regenerator means of the first receiver channel including adding means, an auxiliary receiving channel for receiving signals in said outer portion of said transmission band, said auxiliary channel including demodulator means, and means for applying the output of said auxiliary receiving channel to the input of the adding means of said first receiver channel.

2. The pulse transmission system of claim 1 in which said suppressing means has a transmission characteristic $\phi_1(\omega)$, and the overall transmission characteristics of said auxiliary transmitting channel and said auxiliary receiving channel is $\phi_2(\omega)$, said transmission characteristics being related by the expression $\phi_1(\omega)+\phi_2(\omega)=1$.

3. A pulse transmission system for the transmission of pulse signals in a given transmission band comprising a transmitter, a receiver, and a transmission path between said transmitter and receiver, said transmitter comprising a source of first and second pulse signals, first and second transmitter channels, means applying said first and second signals to said first and second transmitter channels respectively, each of said channels including means for suppressing the direct current component of signals in the respective channel, a source of common carrier oscillations, first and second modulator means for modulating said carrier oscillations with the signals of said first and second channels respectively with a mutual phase displacement of 90°, means providing pilot oscillations of the frequency of said carrier oscillations, an auxiliary transmitter channel for each of said first and second channels, each auxiliary channel comprising means for producing auxiliary modulated oscillations wherein the modulation is related only to direct current components of the signals applied to the respective first and second channel, means for applying said pilot oscillations and the outputs of said first and second modulator means to said transmission path in the central part of said transmission band, and means for applying said modulated auxiliary oscillations to said transmission bands in opposite outer portions of said band outside the portion thereof in which the outputs of said first and second modulators are transmitted; said receiver comprising first and second receiving channels for receiving signals in the central portion of said band, each of said receiving channels comprising demodulator means and pulse regenerator means, means connecting each said demodulator means to said transmission path, and adding means connecting the output of each said demodulator means to the respective pulse regenerator means, said receiver further comprising means providing a local carrier oscillation synchronized with said pilot carrier oscillations, means applying said local carrier oscillations to the demodulator means of each of said receiver channels with a mutual phase displacement of 90° for demodulating the signals corresponding to signals of the respective transmitter channels, an auxiliary receiver channel for each of said first and second receiver channels for receiving signals in an outer portion of said band, said auxiliary receivers including demodulator means, and means for applying the output of each auxiliary receiver channel to the input of the adding means of the respective first and second receiver channel.

4. A pulse transmission system for transmitting pulse signals in a given band to a transmission path, comprising a source of first and second pulse signals, first and second transmitter channels, means applying said first and second signals to said first and second transmitter channels respectively, at least one of said channels including means for suppressing the direct current component of signals in said one channel, a source of common carrier oscillations, first and second modulator means for modulating said carrier oscillations with the signals of said first and second channels respectively with a mutual phase displacement of 90°, means providing pilot oscillations of the frequency of said carrier oscillations, an auxiliary transmission channel including a source of auxiliary oscillations, means for modulating said auxiliary oscillations with the signals applied to said one channel to produce modulated oscillations having only modulation components related to the direct current components of said signals applied to said one channel, means applying said pilot oscillations and the outputs of said first and second modulator means to said transmission path in only the central portion of said band, and means for applying said modulated auxiliary oscillations to said path only in an outer portion of said band outside of said central portion.

5. The pulse transmission system of claim 4 in which said auxiliary channel comprises, an amplitude modulator, means for applying said auxiliary oscillations to said amplitude modulator, low pass filter means for applying said first signals to said amplitude modulator, and means for applying the output of said modulator to said path.

6. The pulse transmission system of claim 4 in which said auxiliary channel comprises means for frequency modulating said auxiliary oscillations with the direct current component of said first signals, and means for applying said frequency modulated oscillations to said path.

7. A transmitter for transmitting pulse signals in a given transmission band, comprising a source of first and second pulse signals, first and second transmitter channels, means applying said first and second signals to said first and second transmitter channels respectively, each of said channels comprising means for suppressing the direct current component of signals applied thereto and modulator means, and means applying the output of each said suppressing means to the respective modulator means, a source of common carrier oscillation means applying said common carrier oscillations to said modulator means of said first and second channels with a mutual phase displacement of 90°, means providing pilot oscillations of the frequency of said carrier oscillations, a common transmission channel, means for applying said pilot oscillations and the output of said modulators of said first and second channels to said common transmission channel only in a central portion of said band, an auxiliary transmitter channel for each of said first and second channels, each auxiliary channel comprising means for producing a modulated auxiliary oscillation with only modulation components related to the direct current components of signals applied to the respective first and second channels and means for applying said modulated auxiliary oscillations in opposite end portions of said band to said common channel, only outside of said central portion.

8. The transmitter of claim 7 wherein said source of said first and second pulse signals comprises a single pulse source, means for converting the leading and trailing edges of the pulses of said pulse source to first and second binary pulse signals respectively, and means for applying said first and second binary pulse signals respectively to said first and second channels respectively.

9. A receiver for receiving a transmitted signal of the type including first and second pulse signals orthogonally modulated on a carrier oscillation in the central portion of a given band, at least one of said pulse signals having passed through a D.C. suppression stage, an auxiliary oscillation having a modulation only related to the suppressed part of said one signal and being in an outer portion of said band, and a pilot oscillation of the frequency of said carrier oscillation; said receiver comprising first and second receiving channels for receiving signals in the central portion of said band, each of said channels comprising demodulator means and pulse regenerator means, means for applying said transmitted signal to each said demodulator means, and means connecting the output of each said demodulator means to the respective pulse regenerator means, the means connecting the output of the demodulator means to the pulse regenerator means of the channel of said receiver adapted to receive said one pulse signal including adding means, said receiver further comprising means for providing a local carrier oscillation synchronized with said pilot oscillation, means applying said local carrier oscillations to said demodulator means of said first and second channels with a mutual phase displacement of 90°, whereby said first and second pulse signals are produced at the output of the demodulator means of said first and second channels respectively, an auxiliary channel for receiving signals in said outer portion of said band, said auxiliary channel including a demodulator, and means for applying the output of said auxiliary channel to the input of the adding means of the channel of said receiver which is adapted to receive said one pulse signal.

10. The receiver of claim 9 in which said auxiliary oscillation is amplitude modulated, wherein said auxiliary channel comprises means for cancelling the constant direct current output of said demodulator resulting from demodulation.

11. A receiver for receiving a transmitted signal of the type including first and second pulse signals orthogonally modulated on a carrier oscillation in the central part of a transmission band after passing through D.C. suppression networks, an auxiliary oscillation on each outer part of said band having a modulation corresponding only to the D.C. components of said first and second signals, and a pilot oscillation of the frequency of said carrier oscillation, said receiver comprising first and second receiving channels for receiving only signals in said central part of said band, each of said channels comprising demodulator means and pulse regenerator means, means for applying said transmitted signal to each said demodulator means, and adding means connecting the output of each said demodulator means to the respective pulse regenerator means, said receiver further comprising means for providing a local carrier oscillation synchronized with said pilot oscillation, means applying said local carrier oscillations to said demodulator means of said first and second channels with a mutual phase displacement of 90°, whereby said first and second pulse signals are produced at the output of the demodulator means of said first and second channels respectively, an auxiliary channel for each of said first and second channels for necessary signals only in a separate outer part of said band, each auxiliary channel having a demodulator, and means for applying the output of each auxiliary channel to the input of the adding means of the respective channel of said first and second channels.

References Cited
UNITED STATES PATENTS 3,123,670   3/1964   Kaenel _____ 178—66
3,031,529   4/1962   Colodny _____ 179—15

JOHN W. CALDWELL, *Acting Primary Examiner.*

DAVID G. REDINBAUGH, *Examiner.*

J. T. STRATMAN, *Assistant Examiner.*